United States Patent [19]

Niskanen

[11] Patent Number: 4,951,524
[45] Date of Patent: Aug. 28, 1990

[54] REMOTE CONTROL ASSEMBLY INCLUDING ROTATING SLIDE SNAP

[75] Inventor: Don L. Niskanen, Livonia, Mich.
[73] Assignee: Teleflex Incorporated, Limerick, Pa.
[21] Appl. No.: 381,528
[22] Filed: Jul. 18, 1989
[51] Int. Cl.$^5$ .............................................. F16C 1/10
[52] U.S. Cl. .................................. 74/502.4; 74/502.6; 248/74.2; 403/137
[58] Field of Search ................. 74/502.4, 502.6, 500.5, 74/501.5 R, 501.6, 502; 248/74.1, 74.2, 74.3; 403/197, 195, 188

[56] References Cited

U.S. PATENT DOCUMENTS

| 3,273,417 | 8/1966 | Sevrence | 74/501.5 R |
|---|---|---|---|
| 3,546,962 | 12/1970 | Ruhala | 74/502.4 |
| 3,955,441 | 5/1976 | Johnson | 74/502.4 |
| 3,995,512 | 12/1976 | Johnsen | 74/502.4 |
| 4,038,881 | 8/1977 | Conrad | 74/502.4 |
| 4,073,200 | 2/1978 | Plate et al. | 248/74.1 |
| 4,095,483 | 6/1978 | Sargeant | 74/502.4 |
| 4,185,515 | 1/1980 | Webb | 74/502.4 |
| 4,339,213 | 7/1982 | Gilmore | 74/502.4 X |
| 4,635,498 | 1/1987 | Zimmermann et al. | 74/502.4 |
| 4,763,541 | 8/1988 | Spease | 74/500.5 |
| 4,805,479 | 2/1989 | Brightwell | 74/501.5 R X |
| 4,844,650 | 7/1989 | Zapushek et al. | 74/502.4 X |

FOREIGN PATENT DOCUMENTS

| 3007461 | 9/1981 | Fed. Rep. of Germany | 74/502.4 |
|---|---|---|---|
| 0798418 | 2/1984 | Fed. Rep. of Germany | 74/502.4 |
| 3428919 | 2/1986 | Fed. Rep. of Germany | 74/502.4 |

*Primary Examiner*—Vinh T. Luong
*Attorney, Agent, or Firm*—Reising, Ethington, Barnard, Perry & Milton

[57] ABSTRACT

A motion transmitting remote control assembly (10) of the type for transmitting forces along a curved path by a motion transmitting core element (28) including a supporting fitting (14) having first and second ends defining a first axis for extending through a substantially U-shaped seat (18) in a support structure (20). A core element (28) is moveably supported by the support fitting (14) for transmitting motion between the ends thereof. The assembly (10) is characterized by including a pair of spaced flanges (52, 52', 54, 54°) supported about the support fitting (14) for allowing relative rotation therebetween and positioning the support fitting (14) in the substantially U-shaped seat (18) on the support structure (20).

14 Claims, 1 Drawing Sheet

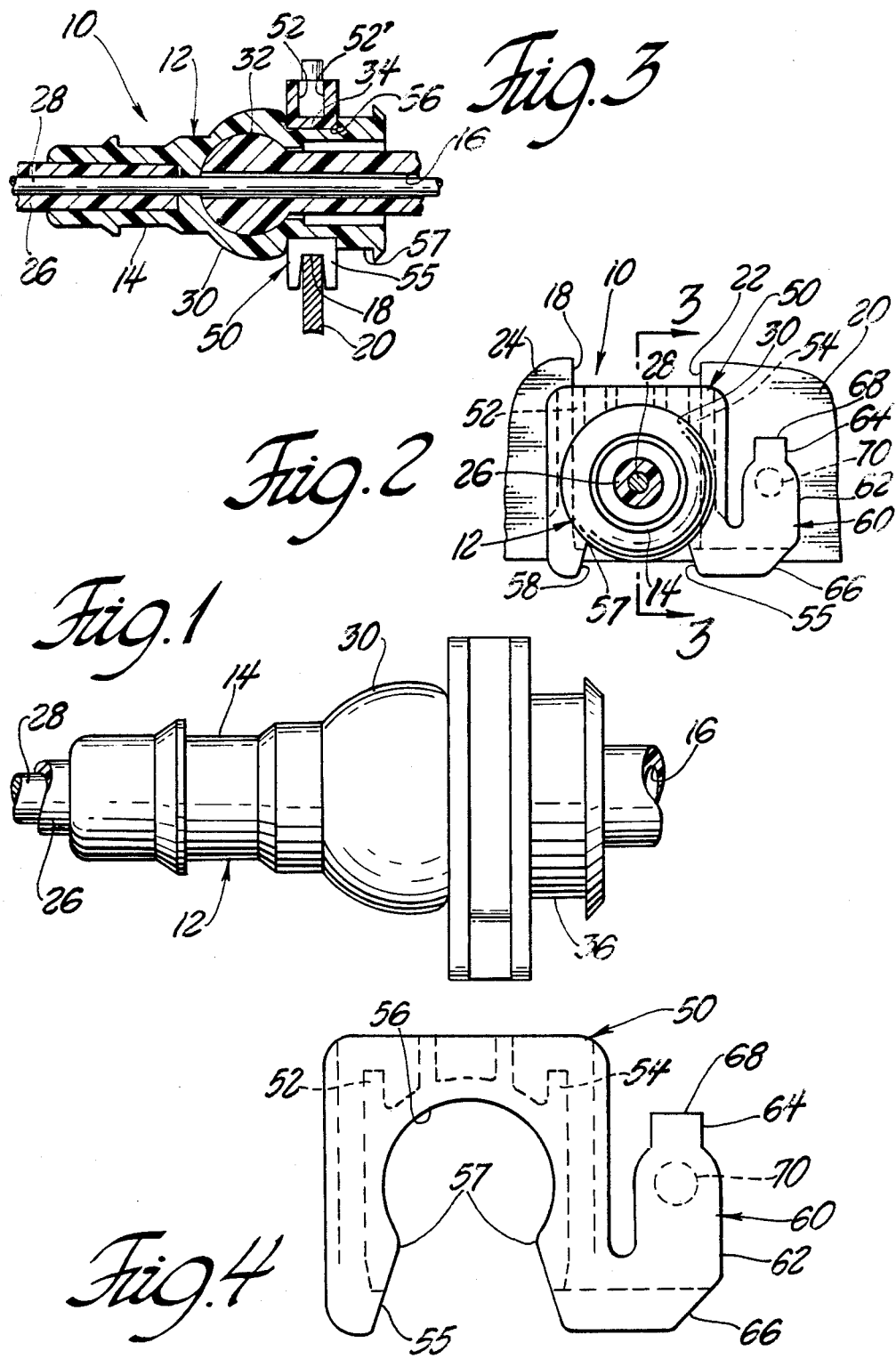

REMOTE CONTROL ASSEMBLY INCLUDING ROTATING SLIDE SNAP

BACKGROUND OF THE INVENTION

1. Field of the Invention

The subject invention relates to a motion transmitting remote control assembly of the type for transmitting forces along a curved path by a flexible motion transmitting core element movably supported within a guide means, such as a conduit. More specifically, the instant invention relates to a guide means including a support fitting and a conduit wherein the support fitting is retained within an opening in a support wall or bracket.

2. Description of the Prior Art

Prior art motion transmitting remote control assemblies have included guide means including a conduit supported within a support fitting. The support fitting is required for disposing the guide means in a wall, or the like, which may have any one of the various thicknesses. Present applications of motion transmitting remote control assemblies require that the guide means guide a core element through a substantially U-shaped seat in a support structure. The instant invention provides an assembly for aligning the guide means for insertion into the substantially U-shaped seat of the support structure.

The U.S. Pat. No. 3,885,767 to Olowinski et al, issued May 27, 1975 discloses a snap-in mounting assembly for preventing a mounting from moving out of a U-shaped seat. The assembly requires at least two projections to maintain the mounting in the seat. The two projections are resiliently bonded to the guide means, thereby preventing any axial rotation thereabout for easy insertion into the U-shaped seat.

The U.S. Pat. No. 4,763,541 to Spease, issued Aug. 16, 1988 discloses a motion transmitting remote control assembly including guides means including a support fitting. In addition, the assembly includes abutment means for positioning the guide means in the substantially U-shaped seat on the support structure. However, the abutment means are not axially rotatable about the guide means, thereby preventing easy alignment of the abutment means with the U-shaped seat.

SUMMARY OF THE INVENTION AND ADVANTAGES

According to the present invention, there is provided a motion transmitting remote control assembly of the type for transmitting forces along a curved path by a motion transmitting core element including guide means having first and second ends defining a first axis for extending through a substantially U-shaped seat in a support structure and a core element moveably supported by the guide means for transmitting motion between the ends of the guide means. The assembly is characterized by including abutment means supported about to the guide means for allowing relative rotation therebetween and positioning the guide means in the substantially U-shaped seat on the support structure.

Accordingly, the present invention offers the advantages of providing abutment means rotatable about the axis of the guide means thereby allowing easy alignment of the guide means with the substantially U-shaped seat on the support structure.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a side view of the instant invention;

FIG. 2 is an end view of the instant invention;

FIG. 3 is a fragmentary cross-sectional view taken along line 3 of FIG. 2; and

FIG. 4 is an enlarged end view of the abutment means.

DESCRIPTION OF THE PREFERRED EMBODIMENT

A motion transmitting remote control assembly of the type for transmitting motion in a curved path is generally shown at 10.

The assembly 10 includes guide means generally indicated at 12. The guide means 12 includes a support fitting 14 having first and second ends and a tunnel 16 extending therethrough defining a longitudinal axis for guiding a core element 28 through a substantially U-shaped seat 18 in a support structure 20. The U-shaped seat 18 has an opening 22 in the top surface 24 of the support structure 20.

The guide means 12 includes a support fitting 14 and a conduit 26 having one end mounted in the tunnel 16 of the support fitting 14. A core element 28 is positioned within the conduit 26 and is moveably supported by the guide means 12 for transmitting motion between the ends of the guide means 12. In addition, the guide means 12 includes a spherical female end portion 30 and a male spherical member 32 pivotally secured within the spherical female end portion 30 for swiveling movement, as shown in FIG. 1. The core element 28 is movably supported on the male spherical end member 32.

The guide means 12 also includes an annular recess 34 disposed between the spherical female end portion 30 and a flanged shoulder portion 36 for receiving an abutment means 50.

The assembly 10 includes abutment means generally indicated at 50, supported about the guide means 12 for allowing relative rotation therebetween. The abutment means 50 includes a pair of spaced flanges 52, 52', 54, 54' extending from the support fitting 14 for abutting engagement of the support structure 20 therebetween to prevent axial movement of the support fitting 14 relative to the support structure 20. The periphery of the flanges 52, 52', 54, 54' is substantially U-shaped The flange 52, 52', 54, 54' define a substantially U-shaped channel therebetween. The abutment means 50 also includes an internal surface 56 being generally circular for insertion onto the annular recess 34 of the support fitting 14. The internal surface 56 defines a circular passage having a gateway 55 extending therein. The gateway 55 is flared outwardly from a throat 57 which is more narrow than the diameter of the circular passage 56.

The assembly 10 further includes gripping means generally indicated at 60 attached to the abutment means 50. The gripping means 60 provides gripping engagement with the support structure 20 and prevents the guide means 12 from moving laterally out of the U-shaped seat 18. The gripping means 60 includes and arm 62 having a top 64 and bottom 66 surfaces defining an L-shape. The arm 62 is disposed in a spaced plane parallel to the abutment means 50 and transverse to the core element 28 so as to extend laterally. The arm 62 extends from the guide means 12 to a distal end 68 spaced laterally relative to the guide means 12. The distal end 68 includes a grip 70 for insertion into an aperture (not shown) on the support structure 20.

In use, the abutment means 50 is sufficiently resilient to forcible snap the throat 57 through the recess 34. The support fitting 14 is then mounted on the substantially U-shaped seat 18 by sliding the flanges 52, 52', 54, 54' over the support structure 20. The flanges 52, 52', 54, 54' prevent axial movement of the guide means 12 while the gripping means 60 prevents lateral movement of the support fitting 14 out of the opening 22 of the support structure 20.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A motion transmitting remote control assembly of the type for transmitting forces along a curved path by a motion transmitting core element while being supported in a U-shaped seat (18) in a support structure (20), said assembly comprising:

guide means (12) having first and second ends defining a first axis for extending through the U-shaped seat (18) in the support structure (20);

a core element (28) movably supported by said guide means (12) for transmitting motion between said ends of said guide means (12);

abutment means (50) for positioning said guide means (12) in the substantially U-shaped seat (18) on the support structure (20), said abutment means (50) being supported on said guide means (12) for allowing relative rotation between said abutment means (50) and said guide means (12).

2. An assembly as set forth in claim 1 further characterized by said abutment means (50) including an internal surface (56) for rotatably engaging said guide means (12).

3. An assembly as set forth in claim 2 further characterized by said guide means (12) including an annular recess (34), said internal surface (56) being rotatably engaged with said annular recess (34).

4. An assembly as set forth in claim 3 further characterized by said internal surface (56) defining a arcuate passage, said abutment means (50) having a gateway (55) extending radially into said arcuate passage for disposing said abutment means (50) onto said guide means (12).

5. An assembly as set forth in claim 4 further characterized by said gateway (55) having a throat (57) which is more narrow than the diameter of said arcuate passage (56) and said annular recess (34).

6. An assembly as set forth in claim 5 further characterized by said gateway (55) being flared outwardly from said throat (57) and said abutment means (50) being generally U-shaped and sufficiently resilient to snap said abutment means (50) onto said annular recess (34) of said guide means (12) as said recess (34) is forced through said throat (57).

7. An assembly as set forth in claim 6 further characterized by said guide means (12) including a partially spherical female end portion (30) and a partially spherical male member (32) pivotally disposed in said partially spherical female end portion (30) for swivelling movement, said core element (28) being movably supported in said partially spherical male member (32).

8. An assembly as set forth in claim 7 further characterized by said guide means (12) including a conduit (26), said female, end portion (30), being disposed between said partially spherical conduit (26) and said abutment means (50).

9. An assembly as set forth in either of claims 6 or 8 further characterized by including an arm (62) extending laterally from said abutment means (50).

10. An assembly as set forth in claim 9 further characterized by said abutment means (50) including a pair of spaced flanges (52, 52', 54, 54') for engagement with the support structure (20) disposed therebetween to prevent axial movement of said guide means (12) relative to the support structure (20).

11. An assembly as set forth in claim 10 further characterized by said flanges (52, 52', 54, 54') defining a substantially U-shaped channel (53, 53') therebetween.

12. An assembly as set forth in claim 11 further characterized by said arm (62) including gripping means (60) for gripping engagement with the support structure (20) and preventing said guide means (12) from moving laterally out of the U-shaped seat (18).

13. An assembly as set forth in claim 12 further characterized by said arm (62) including top (64) and bottom (66) surfaces defining an L-shape and disposed in spaced planes parallel to said abutment means (50) and transverse to said core element (28) so as to extend laterally and spaced from said guide means (12) to a distal end (68) spaced laterally relative to said guide means (12).

14. An assembly as set forth in claim 13 further characterized by said distal end (68) having a grip (70) thereon.

* * * * *